United States Patent [19]
Nonnenmann et al.

[11] 3,844,114
[45] Oct. 29, 1974

[54] GAS TURBINE TEMPERATURE REGULATING CIRCUIT

[75] Inventors: Wolfgang Nonnenmann, Pforzheim; Bert Wurst, Moglingen; Wolfgang Misch, Stuttgart; Edgar Schonart, Lippstadt, all of Germany

[73] Assignee: Robert Bosch G.m.b.H., Stuttgart, Germany

[22] Filed: Feb. 1, 1973

[21] Appl. No.: 328,710

[30] Foreign Application Priority Data
Feb. 21, 1972 Germany............................ 2208040

[52] U.S. Cl. ...... 60/39.16 R, 60/39.25, 60/39.28 T, 60/39.28 R
[51] Int. Cl. .............................................. F02c 3/10
[58] Field of Search ........... 60/39.16 R, 39.17, 39.2, 60/39.24, 39.25, 39.28 T, 39.28 R

[56] References Cited
UNITED STATES PATENTS

| | | | |
|---|---|---|---|
| 3,421,317 | 1/1969 | Bedford | 60/39.28 R |
| 3,470,691 | 10/1969 | Smith | 60/39.16 R |
| 3,523,423 | 8/1970 | Young | 60/39.16 R |
| 3,533,236 | 10/1970 | Cottington | 60/39.28 R |
| 3,601,984 | 8/1971 | Davis | 60/39.28 R |
| 3,606,754 | 9/1971 | White | 60/39.16 R |
| 3,780,527 | 12/1973 | Lewis | 60/39.16 R |

Primary Examiner—Clarence R. Gordon
Attorney, Agent, or Firm—Flynn & Frishauf

[57] ABSTRACT

One regulation loop controls the fuel supply of a gas turbine and another regulation loop controls the setting of the variable gate mechanism between the compressor turbine and the drive turbine. The second of these loops, unlike the first, has both differentiating and integrating elements. Upon depression of the gas pedal to produce acceleration, the rate of change of the lag between the actual engine speed and the desired engine speed (in particular, compressor turbine speed) is formed as a signal by a differentiator, the rectified output of which is provided as a signal additive to the operating temperature regulation signal so as quickly to provide a short period shift of the regulating gate position to prevent excessive rise of the operating temperature. A provision is also made in the second regulating loop for raising the operating temperature for an amount that is safe for a short period during actuation of a kickdown contact when the gas pedal is fully depressed. The various values for modifying the operation of the regulation loops are introduced in multiple input circuits responsive to a minimum or a maximum input signal, as the case may be, and function generators are used to synthesize modifications of signals from direct measurements and also to synthesize the desired operating temperature in terms of gas turbine speed and ambient temperature.

22 Claims, 14 Drawing Figures

PATENTED OCT 29 1974 3,844,114

GAS TURBINE TEMPERATURE REGULATING CIRCUIT

This invention relates to an operating temperature regulating circuit for a gas turbine engine, especially for such an engine as used to power a motor vehicle. The type of engine involved has a variable gate mechanism located between an air compressor turbine and a drive turbine, both driven by the same stream of hot gas issuing from the combustion zone of the gas turbine engine.

Gas turbine engines of the type just mentioned are provided with a regulating circuit to control the fuel feed rate which may rotate at different velocities as they are on independent shafts. For each of these control outputs a multi-input amplifier is provided, which responds to the smallest voltage present on any of its inputs. Since the amplification function is incidential, such a device may be referred to as a minimum input selector. The minimum input selector that dirctly or indirectly controls the fuel supply is provided with input voltages representative of a desired engine speed, the actual speed of the air compressor turbine and of the drive turbine, the temperature of the compressor input and from some approximation of operating temperature. The minimum input selector associated with the control of the variable gate mechanism is supplied with input voltages dependent upon the compressor turbine speed, the drive turbine speed, the compressor input temperature and the operating temperature.

As already mentioned, it is particularly effective to power motor vehicles with gas turbine engines of the twoshaft type, in which the compressor turbine and the drive turbine are not mounted on the same shaft. As the result of the variable gate mechanism between the turbines, such gas turbine engines show good efficiency even under rapidly changing drive speeds. The gate mechanism, moreover, can be varied to such an extent that the drive turbine is not driven, but braked. In this manner it is possible to duplicate the engine braking effect of a piston engine. Regulating circuits of the type mentioned above for control of the fuel supply and the gate mechanism of such an engine are known.

The operating temperature must be regulated in such a way that on the one hand it should be as high as possible, in order to obtain a favorable efficiency of the gas turbine and, on the other hand that it should not exceed an upper limit imposed by the properties of the material from which the gas generator turbine is made. The operating temperature to be established is not the same for all compressor turbine speeds, since account must also be taken of the pumping limit of the compressor turbine, which is further explained below. By operating temperature is meant the temperature of the combustion products at the compressor turbine input.

In the use of the known regulating circuits, it has been found that a motor vehicle with an electrically regulated gas turbine cannot be accelerated as rapidly as is possible with a piston engine of the same power. In practice it is possible to increase the fuel feed with simultaneous adjustment of the gate mechanism only relatively slowly if the operating temperature must be kept from exceeding the predetermined maximum safe value. Thus in the known regulating circuits, the difference between the actual speed of the compressor turbine and the desired speed represented by the position of the "gas" (accelerator) pedal is directly supplied to the minimum input selector serving to control the fuel supply. This speed difference value has not effect, however, on the minimum input selector that serves the control for the gate mechanism. The influence of this speed difference value on the minimum input selector controlling fuel supply, moreover, is limited by some other members of the regulating circuit, which have a partly integrating regulation characteristic. The provisions just outlined safely avoid overstepping the operating temperature limit in known regulating circuits, but this security is obtained at the price of poorer acceleration performance.

It is accordingly an object of the invention to make a substantial improvement in the acceleration performance of an electrically regulated gas turbine engine without, at the same time, raising the average thermal load of the compressor turbine.

SUBJECT MATTER OF THE PRESENT INVENTION

Briefly, a comparator generates a difference signal by comparing the desired speed value as represented by the gas pedal position with the actual speed of the compressor turbine and this signal is provided not only to a first minimum input selector so as to control the fuel supply rate, but also to a differentiator circuit the output of which is furnished to a minimum input selector in such a way that the output signal of the latter, by providing an anticipatory control of the gate mechanism under acceleration conditions, prevents the operating temperature from rising too much. Thus in the case of a rapid positive change of desired speed value, the gate mechanism is opened wider, very quickly and only for a short time period, so that the operating temperature does not rise substantially above the optimum value for which the regulating circuit is set.

The invention will be described by way of example with reference to the accompanying drawings, wherein.

Figure 1:
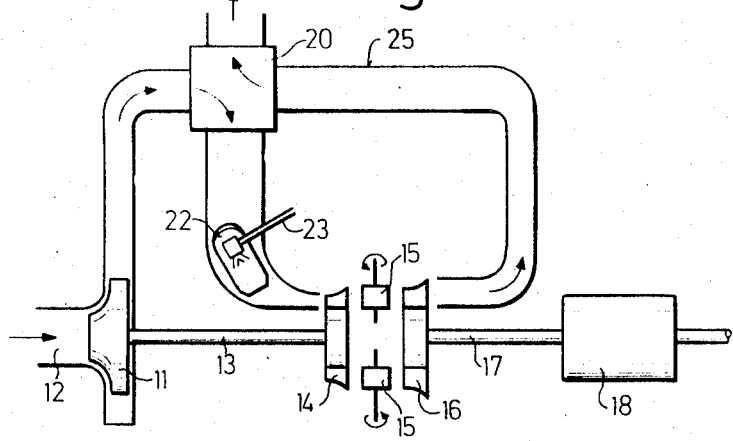
FIG. 1 is a schematic diagram of a gas turbine engine.
Figure 3:
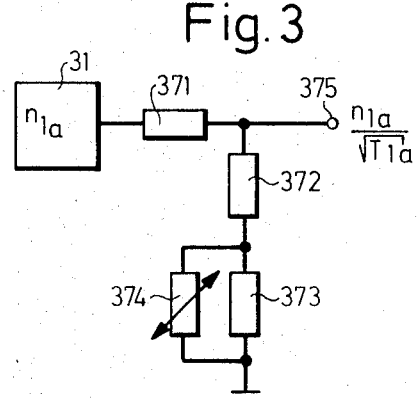
Figure 4A:
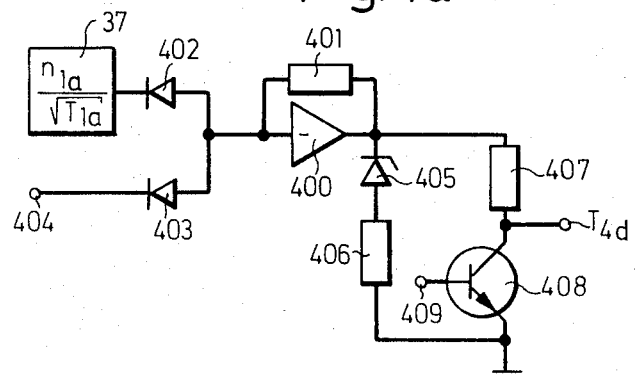
Figure 2:
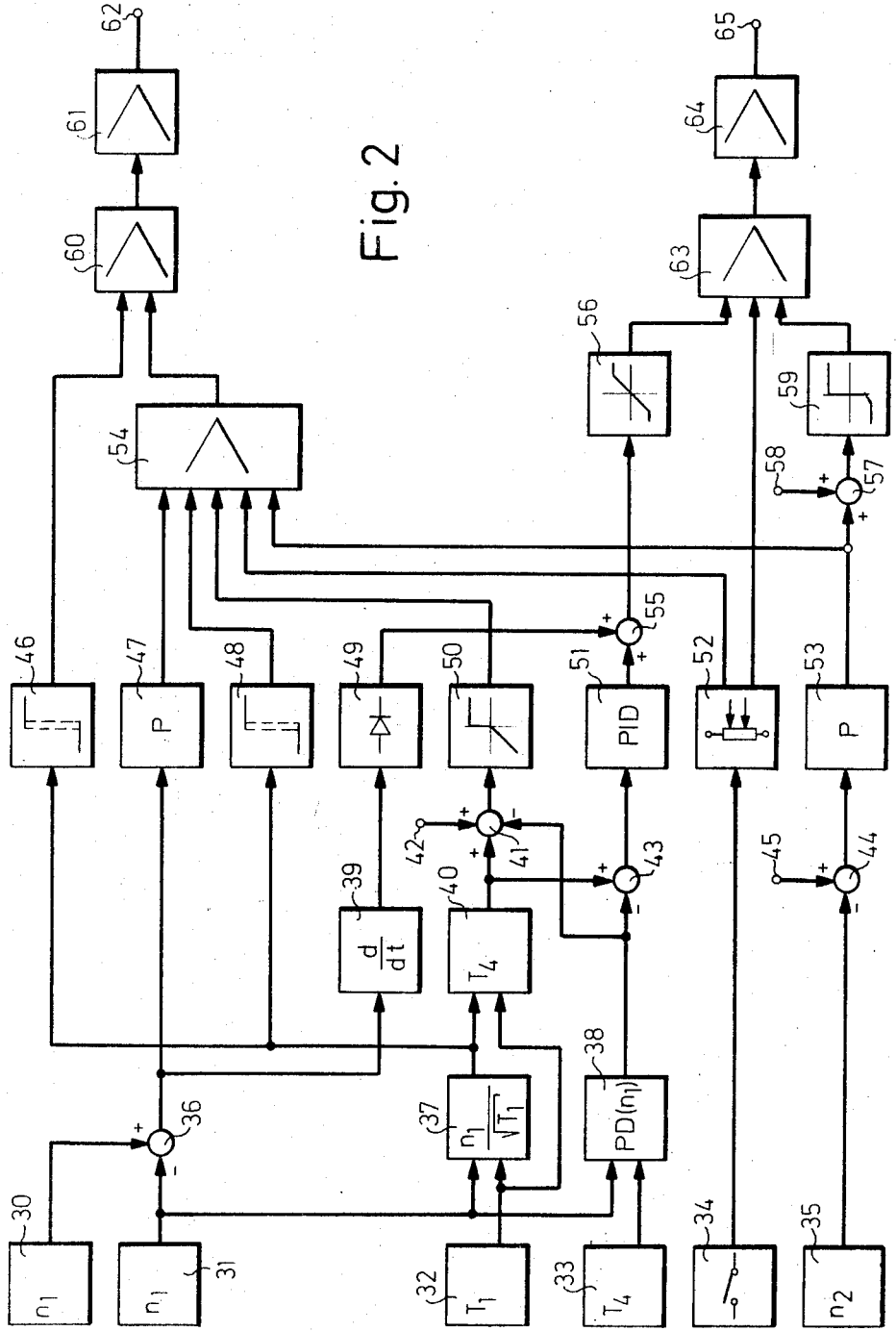
FIG. 2 is a block diagram of an illustrative embodiment of the regulating circuit of the present invention.
Figure 4B:
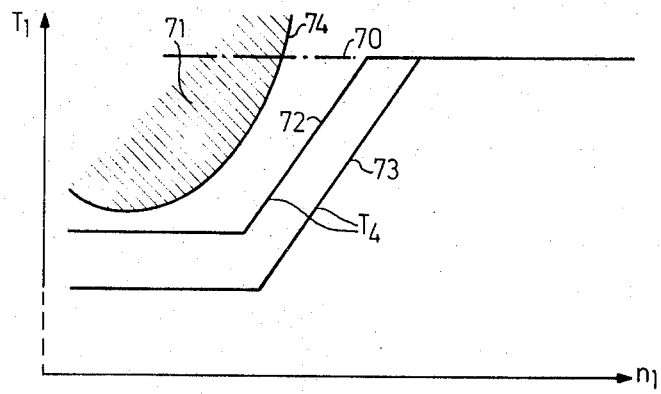
Figure 5A:
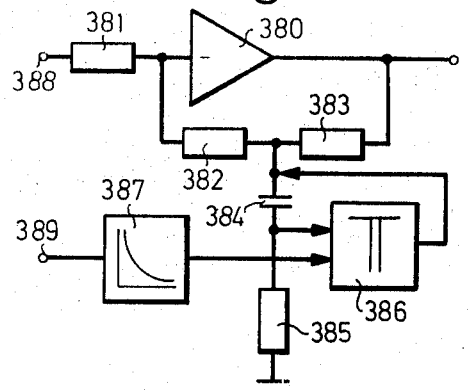
Figure 5B:
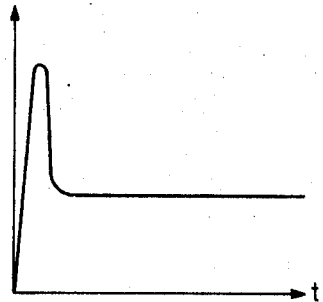
Figure 6A:
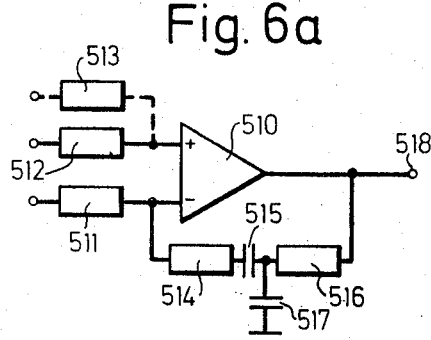
Figure 6B:
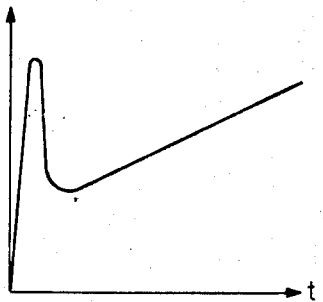
Figure 7A:
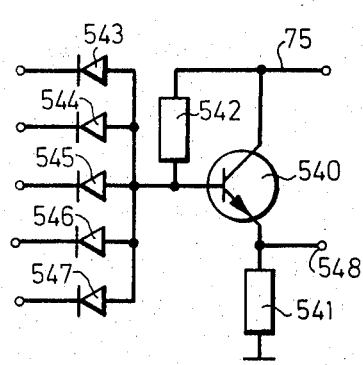
Figure 7B:
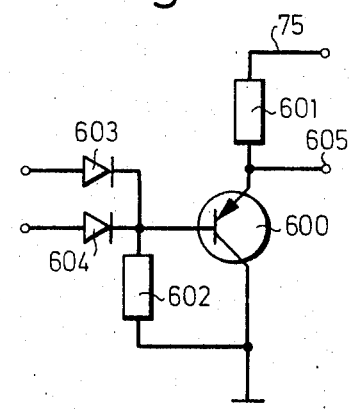
Figure 8A:
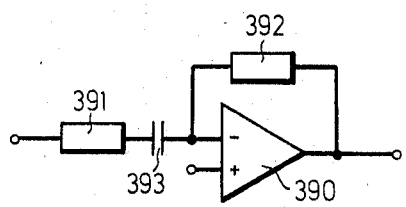
Figure 8B:
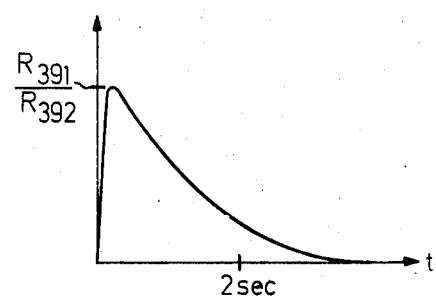
Figure 9:
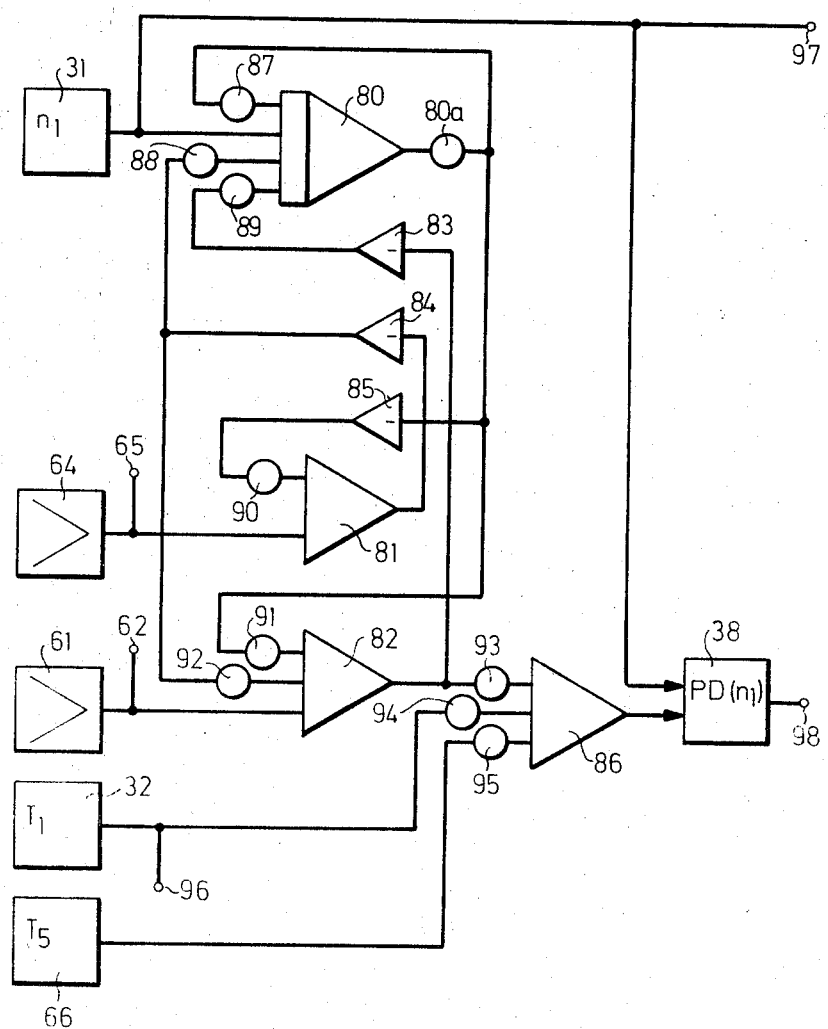

FIG. 3, on the same sheet as FIG. 1, is a circuit diagram of the function generator 37 of FIG. 2;

FIG. 4a, likewise on the same sheet as FIG. 1, is a circuit diagram of the function generator 40 of FIG. 2;

FIG. 4b is a graph showing the nature of the function to be represented by the output voltage of the circuit of FIG. 4a;

FIG. 5a is a circuit diagram of the function generator 38 of FIG. 2;

FIG. 5b is a graph showing the form of response, plotted against time, of the circuit of FIG. 5a to a change of input conditions;

FIG. 6a is a circuit diagram of the PID control circuit 51 of FIG. 2;

FIG. 6b is a graph showing the form of response, plotted against time, of the circuit of FIG. 6a to a change of input conditions;

FIG. 7a is a circuit diagram of the amplifying minimum input selector 54 of FIG. 2;

FIG. 7b is a circuit diagram of the amplifying maximum input selector 60 of FIG. 2;

FIG. 8a is a circuit diagram of the differentiator 39 of FIG. 2;

FIG. 8b is a graph showing the response, plotted against time, of the circuit of FIG. 8a for a change of input conditions, and FIG. 9 is a circuit diagram of the signal transmitter 33 of FIG. 2.

The gas turbine engine shown in FIG. 1 has a variable gate mechanism 15 between a compressor turbine 14 and a drive turbine 16. The compressor turbine 14 has a shaft 13 by which it drives a compressor 11 which sucks air through an air intake 12 and feeds it under pressure into a heat exchanger 20. The preheated air from the heat exchanger 20 then flows on into a combustion chamber 22. Fuel is injected into the combustion chamber by a fuel line 23 and a nozzle. The air coming out of the heat exchanger 20 supports combustion of the fuel. The hot exhaust gases first drive the compressor turbine 14 and, after deflection by the gate mechanism 15 also operate the drive turbine 16 and then flow in expanded condition to the heat exchanger 20. There the exhaust gases give up part of their remaining heat and thus heat the air coming from the compressor 11. The drive turbine drives a reduction gear 18 by means of the drive shaft 17.

In order to keep the operating temperature constant when there is a change of the desired value of engine speed, it is necessary to alter at the same time the fuel supply rate and the adjustment of the gate mechanism 15. The parameters which must be taken into account in this procedure are the compressor speed $n_1$, which is also the compressor speed, the drive turbine speed $n_2$, the compressor input temperature $T_1$ and the operating temperature $T_4$. The regulating circuit necessary for that purpose in accordance with the present invention is shown in block diagram in FIG. 2.

The principal components of the regulating circuit shown in FIG. 2 are two regulating sequences or loops serving respectively to regulate the compressor speed and the operating temperature. All other components generate correction magnitudes for these two regulation loops. The first regulating loop, for the compressor speed, comprises a series chain including, in order of progression, a compressor turbine speed indicator 31, a comparator 36, a proportional control circuit 47, a first amplifying minimum input selector 54, an amplifying maximum input selector 60 and a power amplifier 61. The comparator 36 is of course an algebraic summing circuit and serves for comparison of the desired speed $n_{1d}$ and the actual speed $n_{1a}$ of the compressor turbine. It has an inverting input and a non-inverting input. The desired speed indicator 30 is connected to the non-inverting input, while the compressor speed indicator 31 is connected to the inverting input. The control input of a fuel supply valve (not shown) may, for example, be connected to the output terminal 62 of the power amplifier 61. The compressor speed is thus regulated by variation of the fuel supply rate.

The second regulation loop serves to control the operating temperature by varying the position of the gate mechanism. It comprises, in succession, a first temperature indicator 33, a first function generator 38, a summing circuit 43 (actually the third summing circuit, the second summing circuit 55 being discussed hereafter), a PID control circuit 51, a second proportional control circuit 56 of limited range, a second amplifying minimum input selector 63 and a second power amplifier 64. A servomotor (not shown) may be connected to the output connection 65 of the power amplifier 64 for control of the gate mechanism. The function generator 38, to which the operating temperature indication or calculation and the compressor speed are provided as inputs is provided in the form of a so-called PD regulating amplifier which has both a proportional and a differential response. In this case the differential component is dependent upon the compressor speed $n_{1a}$. The circuit of the function generator 38 is further described below with reference to FIG. 5.

The summing circuit 43 has an inverting input to which the function generator 38 is connected. An operating temperature setting calculator 40 provides its output to the non-inverting input of the summing circuit 43. One input of the calculator 40 is connected to a second temperature indicator 32, while a second input of the calculator is connected to a second function generator 37 which provides a modified compressor speed value. The function generator 37 has two inputs, respectively connected to the second temperature indicator 32 and the compressor speed indicator 31. The circuit diagrams of the function generator 37 and the calculator 40 are shown in FIGS. 3 and 4a respectively.

At the output of the comparator 36 is connected a differentiator 39, the output of which is connected over a rectifier 49 with another summing circuit 55, herein designated as a second summing circuit. The circuit diagram of the differentiating circuit 39 is shown in FIG. 8a.

An auxiliary regulating loop serves to prevent overspeed operation of the drive turbine 16. This regulating loop comprises, in succession, a drive turbine speed indicator 35, a fourth summing circuit 44, the second proportional control circuit 53, a fifth summing circuit 57 and a drive turbine speed limiter 59. The output of the speed limiter 59 is connected to an input of the second amplifying minimum input selector 63. The output of the proportional control circuit 53 is connected with an input of the first amplifying minimum input selector 54. At additional inputs of the summing circuits 44 and 57 there may be connected, by means of the related input connections 45 and 58, respectively, d.c. voltages proportional to the value of the upper speed limit for the drive turbine.

A brake signal source 34 is provided in order to bring the gas turbine engine into braking condition. The brake signal source 34 can, for example, be in the form of a pressure switch such as the brake light switch, which will provide a constant output voltage during braking. The brake signal source 34, however, can also be provided in the form of a potentiometer coupled to the brake pedal so that it can provide a voltage proportional to the desired amount of slowing down. Finally the brake signal source can also be provided as a special motor brake switch, as is done in the case of trucks. The brake signal source 34 supplies a signal to a control signal generator 52. The latter has two outputs respectively connected to inputs of the first and second amplifying minimum input selectors 54 and 63.

Two additional inputs of the first amplifying minimum input selector 54 are connected respectively to a threshold switch 48 and a fuel limit circuit 50. The threshold switch 48 has its input connected to the modified compressor speed output signal of the function generator circuit 37. The fuel limit circuit 50 responds to the output of a summing circuit 41, referred to herein as the third summing circuit, which has an inverting input and two non-inverting inputs. The output of function generator 38 is connected to the inverting input of summing circuit 41, while the output of operating temperature setting calculator 40 is connected to one of the non-inverting inputs, while the other non-inverting input of summing circuit 41 is connected over an input terminal 42 to a d.c. voltage, which serves as a measure for a temporarily permissible temperature excess T.

A second threshold switch circuit 46 is connected between the output of the function generator 37 providing the modified compressor speed signal and a second input of the amplifying maximum input selector 60. Instead of the two threshold switch circuits 46 and 48, function generators could also be used which — as is common in analog computer technology — consist of resistor-diode networks. Such diode function generators can produce an output voltage corresponding to any desired non-linear function of the input voltage. It is possible with such circuits to provide even more accurate correction to the regulating characteristic of the first regulating loop than can be accomplished with threshold switching circuits. Circuit diagrams of the amplifying minimum input selectors 54 and 63 and of the amplifying maximum input selector 60 are shown in FIG. 7.

The amplifying minimum input selector circuit, shown in FIG. 7a, includes an npn-transistor 540 arranged with its collector connected to a positive voltage bus 75 and with its emitter connected to chassis or ground over a resistor 541. A resistor 542 is connected between the positive voltage bus 75 and the base electrode of the transistor 540. Five control inputs of the minimum input selector are provided by five diodes 543, 544 . . . 547, which all have their cathodes connected to the base of transistor 540. The emitter of the transistor is the output electrode connected to an output terminal 548. Base current is provided to the transistor 540 over resistor 542. A portion of the current flowing through resistor 542 is branched off to the diode of which the cathode has the lowest potential. The transistor 54o is thus turned off to the extent corresponding to the lowest input voltage on the diodes 543, 544 . . . 547.

As shown in FIG. 7b, the amplifying maximum input selector 60 contains a pnp-transistor 600 with its collector connected to chassis or ground and its emitter connected over a resistor 601 to the positive voltage bus 75. The emitter operates as the output electrode and is connected to an output terminal 605. The base of the transistor is connected over a resistor 602 to chassis or ground. Two diodes 603,604 are connected to the base of transistor 600 to provide the two separate inputs of the maximum input selector. The manner of operation is the same as in the case of the minimum input selector shown in FIG. 7a. The transistor 600 is more and more turned off, the higher the input potential rises at one of the diodes 603,604.

It may be seen from FIG. 2 that — at least so long as the correction factors are left out of consideration — the amount of fuel supplied per unit of time is proportional to the deviation of the desired speed from the actual speed of the compressor turbine. The first regulation loop thus contains only the linear amplifying units 47,54,60 and 61. The more the actual speed lags below the desired speed, the more fuel will be supplied to the gas turbine.

With such a control of the fuel supply, it could still happen that for small deviations of the actual speed from the desired speed there would no longer be supplied enough fuel to maintain combustion in the combustion chamber 22. For this reason, the threshold switch (or diode type function generator) 46 is provided. Its output signal is a measure of the minimum rate of fuel supply necessary for maintaining combustion. The threshold switch 46 provides a larger signal above its switching threshold and a smaller signal below its threshold, because at low speeds only a small amount of fuel is necessary to maintain combustion.

The second main regulation loop, which controls the position of the gate mechanism, uses as the measured value to be maintained or modified for regulation the operating temperature $T_{4a}$. For measuring the operating temperature $T_{4a}$, a thermocouple located at the input of the compressor turbine 14 is used having one leg of nickel and the other leg of a chromium-nickel alloy. The output voltage of the thermocouple in the first temperature indicator 33 follows temperature change only with a certain time delay, which is determined by the heat capacity of the thermocouple. Since this time delay should be compensated, there is provided in the regulation chain a function generator 38 constituted as a control circuit with both a proportional and a differential characteristic. This type of circuit should be designated as a PD control circuit or a PD regulator. The term regulator is preferable because it more correctly implies the comparison function provided by a negative feedback that is incorporated in this type of circuit, which is shown for the function generator 38 in FIG. 5.

This function generator includes an operational amplifier 380 the output of which is coupled back to its inverting input over a series connection of two resistors 382 and 383 providing negative feedback. The inverting input is also connected over a resistor 381 to a first input terminal 388, which in turn is connected to the first temperature indicator 33. The common connection of the resistors 382 and 383 is connected to ground over the series combination of a capacitor 384 and a resistor 385.

The components of this circuit described up to this point constitute a PD regulator. For explanation of this circumstance the step function response of the PD regulator is shown in FIG. 5b, which is a graph of the output voltage of operational amplifier 380 plotted against time beginning with a moment when the input voltage jumps stepwise from a first constant value to a second constant value. The peak of the transient response is generated by the capacitor 384 because immediately after the input step this capacitor short-circuits the negative feedback path 382,383 to ground. When the capacitor 384 is charged, the negative feedback over the resistors 382 and 383 is again effective on the operational amplifier 380 so that it operates as a proportional amplifier.

The time lag of the thermocouple is compensated by the circuit just described in the first temperature indicator 33. This time lag, however, depends not only on the heat capacity of the thermocouple but also on the flow velocity of the surrounding gas, since more heat per unit of time can be carried to or from the device by a fast flowing gas than by a gas flowing slowly. For this reason, the capacitance of the capacitor 384 should be varied in accordance with the gas turbine speed $n_1$. For higher speed, a smaller capacitance is needed. To change this capacitance, a multiplying circuit 386 is used, which has its output connected to the common connection of the resistors 382 and 383 and possesses two inputs. The first input of the multiplier is supplied with a signal from the compressor speed indicator 31 that appears at the input terminal 389 and is transformed to its reciprocal in the reciprocal circuit 387 before reaching the multifplier 386. The second input of the multiplier is connected to the common connection of capacitor 384 and resistor 385.

The multiplier output draws a current out of the negative feedback path constituted by the resistors 382 and 383, which current is the greater the more current flows into capacitor 384 and the smaller the speed $n_1$ is. Thus for lower values of the speed $n_1$, a larger capacitor 384 is simulated. The next element in sequence in the second regulation loop is the PID regulating amplifier 51, the designation PID indicating that it has proportional, integral and differential elements the effects of which are additively combined. The circuit of this regulating amplifier is shown in FIG. 6a and its step response in FIG. 6b. The PID regulating amplifier 51 is built around an operational amplifier 510 the two inputs of which at the same time incorporate the summing circuit 43 of FIG. 2. The non-inverting input is connected over a resistor 512 to the output of the function calculator 40 the synthesizes a signal representing the desired operating temperature $T_{4d}$. The inverting input of the regulating amplifier 51 is connected over a resistor 511 to the function generator 38, which has already been described. Still another resistor 513 is indicated in dashed lines, for the purpose of showing the circuit of the fuel supply limit circuit 50, which is substantially the same except that a third input over a resistor 513 is needed, as well as the negative feedback resistor connected like the resistor 392 of FIG. 8a instead of the more elaborate negative feedback network shown in FIG. 6a. With the inputs and negative feedback just described, an operational amplifier can accomplish the functions of the fuel supply limit circuit 50 and of the summing circuit 41 which precedes it.

The negative feedback network of the PID regulating amplifier 51 includes a series branch composed of resistor 514, capacitor 515 and resistor 516 and of a shunt branch provided by capacitor 517 connected between chassis or ground and the junction of capacitor 515 and resistor 516.

The step reponse of a PID regulating amplifier is plotted against time in FIG. 6b. The peak again depends upon the shunt capacitor in the feedback network, here capacitor 517, just as in the case of the PD regulator response shown in FIG. 5b. The capacitor 515 provides the constant rise after the decay of the peak. The integral component of the characteristic of the regulating amplifier 51 corresponding to the constant rise just mentioned is necessary in order to assure suppression of persistent regulation errors in the gate mechanism position. The differential component provided by the capacitor 517 improves the stability of the second regulation loop. The next unit in succession in the second regulation loop is the proportional regulator 56. As shown symbolically in FIG. 2 it has a limiter characteristic at both the high and low ends of its input voltage range. The two limiting voltages corresponding to the end positions of the gate mechanism.

The summing element 55 between the PID regulating amplifier 51 and the proportional amplifier 56 enables a second input to be introduced additively from the differentiator 39 over the rectifier 49 in order to influence the output of the amplifier 56. The circuit diagram and the step response of the differentiator 39 are shown respectively in FIGS. 8a and 8b.

The differentiator 39 is built around an operational amplifier 390, which has a feedback resistor 392 from its output to its inverting input. An input resistor 391 feeds the inverting input of operational amplifier 390 through a differentiating capacitor 393 with which it is in series. If the signal representing the desired speed for the compressor turbine 14 is quickly changed by depressing the gas pedal (desired speed indicator 30), the differentiator 39 then quickly produces a slowly decaying voltage peak, such as is shown in FIG. 8b. The height of the voltage peak is determined by the ratio of resistors 391 and 392. The rectifier 49 passes only positive voltage peaks, which correspond to vehicle acceleration. Negative voltage peaks are suppressed. When a positive voltage peak occurs, it is transmitted over the summing element 55 and the proportional amplifier 56 so as to open the gate mechanism for a short period.

The maximum power that a gas turbine can develop is the greater, the lower is the ambient temperature $T_1$. For this reason, instead of the compressor turbine speed $n_1$ a reduced value $n_1/\sqrt{T_1}$, performed by the function generator 37, is supplied to the calculator 40 which synthesizes the desired value of the operating temperature $T_{4d}$, which is therefore raised in value when the outside temperature is low. Dividing circuits are known in the analog computer art by which such quotients can be produced. As a further feature of the invention, however, the simple circuit shown in FIG. 3 is provided, by which a good approximation for the quotient $n_1/\sqrt{T_1}$ can be continuously generated.

As shown in FIG. 3, three resistors 371, 372 and 373 connected in series are simply connected between the output of the compressor speed indicator 31 and the chassis or ground bus of the system. A negative temperature coefficient (NTC) resistor 374, of which the value of resistance depends upon temperature according to an exponential function, $R(D) = A \cdot e^{B/T}$, is connected in parallel to resistor 373. In the equation just given, A and B are constant values that are characteristic for the particular NTC resistor. The output of the circuit is taken from the common connection of resistors 371 and 372, as indicated by the output terminal 375.

The maximum error in the determination of the quotient $n_1/\sqrt{T_1}$ remains less than 0.2 percent over a temperature range from −30°C to +40°C if the resistors of the circuit shown in FIG. 3 are provided with values in accordance with the following table:

371  R = 1.00 kΩ
372  R = 3.48 kΩ
373  R = 239.5 kΩ
374  A = 0.8Ω, B = 2,400 ° K

The NTC resistor 374 of FIG. 3 operates as the second temperature indicator 32 of FIG. 2. It is desirable in this case for the proper operation of the function generator 40 that synthesizes $T_{4d}$ to provide an individual duplicate second temperature indicator 32, for example a thermocouple, to supply its output to the function generator 40, since the latter needs at its second input an input signal that depends linearly on the compressor input temperature $T_1$.

In addition to the function generator 40, the previously mentioned threshold switches 46 and 48 are connected to the output of function generator 37. The threshold switch 48 (or the diode function generator which, as previously mentioned, may replace it) provides a limitation to the fuel supply rate depending upon the reduced compressor turbine speed $n_1/\sqrt{T_1}$. The threshold value switch 48 accordingly provides a d.c. voltage signal corresponding to its switching condition, to an input of the first minimum input selector 54.

The circuit of the function generator 40 which sets the desired value of operating temperature is shown in FIG. 4a (which is on the same sheet as FIG. 1). An operational amplifier 400 has a negative feedback resistor 401 connected between its output and its inverting input. That same input of the operational amplifier 400 has two diodes 402 and 403 connected to it for input connections. The first diode 402 is connected to the output of function generator 37, while the second diode 403 is connected over a terminal 404 shown in FIG. 4a to a fixed reference voltage (not shown). The series combination of a Zener diode 405 and a resistor 406 is connected between the output of operational amplifier 400 and the ground or chassis bus. In parallel to this series combination is the series combination of the switching path of a transistor 408 and the related collector resistor 407. The base of transistor 408 is connected to the terminal 409 of FIG. 4a at which the second input of the function generator 40 is supplied, which is to say that, as shown in FIG. 2, the output of the second temperature indicator 32 is connected here.

FIG. 4b, which is on the same sheet as FIGS. 5 and 6, is a diagram showing the dependence of the desired value of operating temperature $T_{4d}$, as generated by the circuit of FIG. 4a, upon the compressor turbine speed $n_1$ and the gas generator input temperature $T_1$. A shaded area 71 is shown in this diagram. This shaded area designates the conditions under which the operation of the compressor 11 is unstable. The boundary 74 of the region 71 is known as the pump limit. Under all conditions, the operation of the compressor turbine 14 must be kept from falling into the drive region 71, since that would result in destruction of the gas turbine.

The horizontal line 70 represents the value of the operating temperature $T_{4d}$ to be set into the system for regulation. This value is, as already mentioned, determined by the construction material of the compressor turbine 14. For low speeds ($n_1$) of the gas generator turbine 14 the line 70 passes into the shaded area 71. Consequently, the desired value of operating temperature must be diminished for small values of the speed $n_1$. The operating temperature desired value $T_{4d}$ must therefore run as shown by the curve 72. Account must further be taken of the fact that the dangerous area 71 expands at lower compressor input temperature $T_1$, so that another desired operating temperature $T_{4d}$ value must be set in, for example in accordance with the curve 73. The $T_{4d}$ curves 72,73 must accordingly back off farther down and to the right, the lower the compressor input temperature $T_1$ is.

In the circuit shown in FIG. 4a, the reference voltage supplied at the terminal 404 determines the upper speed limit at which the curves 72,73 intersect the line 70. If the output voltage of the function generator 37 becomes greater than the reference voltage on the terminal 404, then the gas generator speed $n_1$ no longer has any effect. The Zener diode 405, on the other hand, determines the lower knee of the curves 72 and 73. Since the operational amplifier 400 inverts, this diode has a limiting effect at lower input voltages. The transistor 508 together with its collector resistor 407 form a variable voltage divider, the division ratio of which is variable in response to the compressor input temperature $T_1$. The output voltage of the second temperature indicator 32, which is applied to the terminal 409, thus provides the shift that distinguishes the curve 73 from the curve 72 or any other curve of the same family.

The desired value of operating temperature is compared with the corresponding actual value $T_{4a}$ in both summing circuits 41 and 43. The summing circuit 43, herein referred o as the second summing circuit, is connected ahead of the regulating amplifier 51, which is constructed as a continuous regulator with a PID characteristic. On the other hand, the third summing circuit 41 is connected ahead of the fuel limiter 50. The latter is constituted as an intermittent regulator and limits the fuel supply only when an upper temperature limit is exceeded, that is, when the actual value of $T_4$ has become greater than the desired value of $T_4$. The fuel limiter 50 can thus be constituted as a simple amplifier stag having a Zener diode across its input. That results in an amplifying characteristic as indicated in FIG. 2. The fuel supply rate is then more sharply limited, the higher the actual value of $T_4$ rises over the desired value.

An additional d.c. voltage can be applied at the terminal 42, which will represent the magnitude of the allowance for a permissible increment $\Delta T$ above the desired value of operating temperature $T_{4d}$. As already mentioned above, such a rise in the temperature limit comes into play when the vehicle driven by the gas turbine is sharply accelerated. It is therefore important that the signal for a permissible excess temperature should not persist at the terminal 42, but rather that terminal 42 sould be connected to a kickdown contact. An excess temperature will then be permitted only when the driver presses the gas pedal all the way down.

The supply voltage for the regulating value generator 52 is supplied over the brake signal source 34. This regulating value generator 52 can be constituted by a potentiometer with two taps. The two taps are respectively connected to inputs of the first and second minimum input selectors 54 and 63. That means that after operation of the brake pedal the gate mechanism 15 brought into its braking position the operation of the second minimum input selector and amplifier 63 and at the same time fuel supply is controlled by the first minimum input selector 54. The fuel supply rate is then so chosen as to provide the best braking effect.

The components 35,44,53,57 and 59, finally, serve to monitor and respond to the speed of the drive turbine 16. The drive turbine speed indicator 35 is mechanically connected to the drive turbine shaft 17 (FIG. 1). D.c. voltages can be provided at the terminals 45 and 58 to set the magnitude of the upper speed limits of the drive turbine 16. The speed limit provided at the terminal 45 is in this case set somewhat lower than the limiting value provided at the terminal 58.

If the drive turbine speed exceeds the maximum speed set at the terminal 45, the proportional regulator 53 then gives an output signal which progressively closes down the fuel supply rate by operation of the first minimum input selector 54, the more this speed limit is exceeded. If in spite of the fact the speed continues to increase — for example when going downhill — the second speed limit, set at the terminal 58, will then be exceeded. The drive turbine speed limiter 59 is then activated and shifts the gate mechanism in the direction that reduces the torque of the drive turbine 16. Upon a greater overshoot above the speed limit, the output signal of the drive turbine speed limitor reaches a value which is sufficient to bring the gate mechanism all the way into its braking position. The amplifying chracteristic of the drive turbine speed limiter 59, which is necessary to produce this result, is drawn on the block 59 in FIG. 2. This operation characteristic can be realized with a limiting amplifier across the input of which a Zener diode is connected.

The speed limiting function for the drive turbine 16 thus operates in two steps: at first only the fuel supply is limited, and if this operation remains ineffective, the position of the gate mechanism is altered.

In the regulating circuit above described, the measurement of the operating temperature $T_4$ presents the greatest difficulties. To be safe, therefore, two thermocouples are built into the first temperature indicator 33. The outputs of the two thermocouples can be connected in parallel. As soon as one of the thermocouples fails, an alarm signal is given. It is also possible, however, to dispense fully with thermocouples for measuring the operating temperature if the operating temperature $T_4$ is approximated or calculated by means of a computer circuit as shown in FIG. 9, using as controlling variables the respective outputs of the compressor speed indicator 31, the first power amplifier 61, the second power amplifier 64, the second temperature indicator 32 and a third temperature indicator 66.

In FIG. 9 small circles are used as circuit diagram symbols for coefficient potentiometers. Such a coefficient potentiometer consists of a resistor with a variable tap and with the ends of the resistor connected respectively with the output of the previous stage and with the ground or chassis bus. The tap of the potentiometer is connected to the input of the following stage.

On the output side of the computer circuit shown in FIG. 9 is a first inverting adder 86, which is connected to follow the three coefficient potentiometers 93, 94 and 95. The coefficient potentiometers are all connected to the inverting input of the operational amplifier. The coefficient potentiometers 93,94 and 95 receive their respective inputs from the outputs of a second inverting adder 82, the second temperature indicator 32 and a third temperature indicator 66. The third temperature indicator 66 measures the temperature $T_5$ at the input of the heat exchanger 20 (in the piping 25).

The first input of the first inverting adder 82 is connected over a coefficient potentiometer 91 to a coefficient potentiometer 80a. Its second input is connected over a coefficient potentiometer 92 to the output of an inverter 84, while its third input is connected to the output of the first power amplifier 61. The input of the inverter 84 is connected to the output of a third inverting adder 81, which has two inputs. The first input of the third inverting adder 81 is connected over a coefficient potentiometer 90 to the output of an inverter 85, while its second input is connected to the second power amplifier 64. The inverter 85 has its input connected to the coefficient potentiometer 80a, which is supplied with the output of an integrator 80. The integrator 80 has four inputs, of which the first is connected over a coefficient potentiometer 87 with the coefficient potentiometer 80a, the second is connected with the output of compressor speed indicator 31, the third is connected over a coefficient potentiometer 88 with the output of the inverter 84 and the fourth is connected over a coefficient potentiometer 89 and an inverter 83 with the output of the second inverting adder 82.

In FIG. 9 the output terminals 62 and 65 of the power amplifiers 61 and 64 are shown. The function generator 38, one of the inputs of which is supplied by the first inverting adder 86, is also shown in FIG. 9 with its output terminal 98 and with its other input connected to the compressor speed indicator 31, which also has another output at the terminal 97. The second temperature indicator 32 also provides its output at the terminal 96.

With appropriate dementioning of the coefficient potentiometers, it is possible to produce a good approximation of the operating temperature $T_4$ by means of the computer circuit shown in FIG. 9. The important result is that the critical measurement of the operating temperature does not have to be actually carried out with this arrangement. The compressor turbine speed $n_1$ is directly supplied to the integrator 80 in order to bring into play the dynamic behavior of the gas turbine. The mass of the compressor 11 and the mass of the air must be accelerated before the operating temperature $T_4$ can be raised. This time relation is simulated by the time delay of the integrator 80, to a first approximation. The two other measured values (gate mechanism angle and fuel supply rate) are introduced over proportionally and integrally operating amplifiers 80,81 82 and 86. Characteristic values specific for the particular gas turbine engine can be set in with the coefficient potentiometers.

The manner of operation of the regulating circuit shown in FIG. 2 can be summarized as follows: Two separate regulation loops are provided respectively for compressor speed and for the operating temperature. The first regulating loop controls fuel supply rate and contains only proportional amplifiers, so that it has a proportional regulation characteristic. This regulating loop therefore responds quickly to its input signals, that is, the difference between the desired and actual values of the compressor speed. Five correction signals are provided to the first regulating circuit by means of the first minimum input selector 54 and the maximum input selector 60. The reduced compressor speed $n_1/\sqrt{T_1}$ provided by the function generator 37 operates the two threshold switches 46 and 48, the first to maintain combustion at low speeds and the other to limit the fuel supply at high speeds. The fuel limiter 50 limits the fuel supply as soon as the desired operating temperature $T_{4d}$ is allowed to exceed its normal maximum by a permissible increment $\Delta T$. The permissible extent of temperature increase $\Delta T$ is set into $T_{4d}$ by a kickdown contact connected to the gas pedal. It is thus assured that the operating temperature will be raised only for a short period. The regulating value generator 52 sets a particular fuel supply rate as soon as the brake pedal is actuated, so long as the threshold switch 46 does not require a greater fuel supply. The proportional amplifier 53, finally, limits the fuel supply rate as soon as an upper speed limit is exceeded by the drive turbine 16.

The second regulation loop serves to set the position of the gate mechanism. It includes, in contrast to the first regulation loop, not only proportional amplifiers, but also the function generator 38 with its PD regulation characteristic and the PID regulating amplifier 51. The differential components (D) of the regulator characteristics are necessary because time delays of temperature measurement in the temperature indicator 33 must be compensated. Furthermore, the regulating amplifier 51 has an integrating component in its regulation characteristic in order to take account of persisting regulation errors resulting from change in load.

The first temperature indicator 33 signals the operating temperature to the function generator 38 in the first step of the second regulating loop. The differential component of the regulation characteristic of function generator 38 varies in dependence on the compressor speed $n_1$. In the summing circuit 43 the desired value $T_{4d}$ of the operating temperature is compared with the actual value $T_{4a}$. In the summing circuit 55 still another acceleration signal comes into play, derived from the desired speed indicator 30 and delivered over the differentiating circuit 39 and the rectifier 49. When the vehicle is accelerated, the gate mechanism is accordingly opened wider for a short period and peak values of operating temperature are anticipatorily mitigated.

Two correction magnitudes are introduced at the minimum input selector 63. When the brake pedal is actuated, the signal circuit 52 provides a braking signal of a magnitude designed to put the gate mechanism in its braking position. Also, the drive turbine speed limiter 59 provides a signal to shift the gate mechanism in the direction towards braking the speed of the drive turbine continues to rise even through the proportional regulator 53 is limiting the fuel supply rate.

The regulating circuit above described accordingly accomplishes the object of the invention. The differentiator 39 makes it possible to shift the gate mechanism of the gas turbine very quickly when there is a sharp acceleration and thus to avoid a transient increase of the operating temperature. On the other hand, with the help of a kickdown contact, the operating temperature can be raised for a short period by an amount that is still not dangerous for the construction material of the compressor turbine. The behavior of the gas turbine under acceleration is improved by these two provisions without making it necessary to raise the average operating temperature.

Although the invention has been described with respect to a particular illustrative embodiment, it will be understood that variations and modifications are possible within the concept of the invention without departing from the spirit of the invention.

We claim:

1. A regulating circuit for controlling the operating temperature of a gas turbine engine having a variable gate mechanism between a compressor turbine and a drive turbine, comprising:

means for producing voltages representative, respectively, of the magnitudes of desired engine speed (30), compressor turbine speed (31), compressor input temperature (32), operating temperature (33) and drive turbine speed (35);

comparison means (36) for producing a voltage representative of the difference between said desired engine speed and said compressor turbine speed in response to said voltages respectively representative of said last-mentioned speeds;

differentiator means (39) responsive to said voltage produced by said comparison means (36) for producing a voltage representative of the rate of increase of the voltage produced by said comparison means (36), said differentiator means having rectifying means (49) interposed in its output for suppressing signals resulting from lag in desired deceleration of said compressor turbine;

a first multi-input minimum input selector (54) arranged to be responsive to said voltage representative of the difference between desired engine speed and compressor turbine speed, to a voltage representative of a magnitude which is a function of both compressor input temperature and said compressor turbine speed and a voltage representative of a magnitude which is a function of operating temperature, the output of said first minimum input selector being arranged to control the rate of fuel supply, and a second multi-input minimum input selector (63) arranged to be responsive to voltages respectively primarily representative of drive turbine speed and operating temperature and further responsive to the output of said differentiator means (39) as a voltage additive to a voltage representative primarily of operating temperature, said second multi-input minimum input selector (63) being arranged to control said variable gate mechanism and being adapted, by virtue of its aforesaid responsiveness to said differentiator means output, to exert an anticipatory character of control on said variable gate mechanism during acceleration.

2. A regulating circuit as defined in claim 1, in which the output of said comparison means is provided to a proportional control circuit (47) the output of which is connected with one input of said first minimum input selector (54).

3. A regulating circuit as defined in claim 2 in which a first function circuit (38) is connected to the output of said means for producing a voltage representative of compressor turbine speed and to the output of said means for producing a voltage representative of operating temperature and in which the output of said function circuit (38) is supplied to an input of said second minimum input selector (63) over a series arrangement of a PID control amplifier (51) followed by a second proportional control circuit (56).

4. A regulating circuit as defined in claim 3 in which a summing circuit (55) having as inputs respective outputs of said rectifier (49) and said PID control amplifier (51) supplies the input to said second proportional control circuit (56).

5. A regulating circuit as defined in claim 4 in which a second function circuit (37) is provided for producing an input representative of the compressor turbine speed divided by the square root of the compressor input temperature and arranged to utilize as inputs the respective outputs of said means for producing a voltage representative of compressor input temperature and compressor input temperature, in which further the output of said desired operating temperature calculator (40) is supplied to a second circuit (43) and to a third summing circuit (41), in which further the output of said first function generator (38) is furnished to said second and third summing circuits in opposition to said output of said calculator (40), in which further the output of said third summing circuit (41) is supplied to an input of said second minimum input selector (54) and in which the output of said second summing circuit (43) is furnished to the input of said PID control amplifier (51).

6. A regulating circuit as defined in claim 5 in which a fuel supply limiting circuit (50) is provided between the output of said third summing circuit (41) and the input related thereto of said first minimum input selector (54), and in which said third summing circuit has a third input adapted to determine a short-period-permissible increment above the normal upper temperature limit.

7. A regulating circuit as defined in claim 6 in which said third input (42) of said third summing circuit (41) is connected to a kickdown contact adapted to be actuated by the accelerator pedal of a motor vehicle for which said gas turbine engine provides motive power.

8. A regulating circuit as defined in claim 5 in which a threshold switch circuit (48) is connected to the output of said second function generator (37) for limiting the fuel supply rate in response to compressor turbine speed and in which the output of said threshold switch is connected with an input of said first minimum input selector (54).

9. A regulating circuit as defined in claim 8 in which means for producing a braking signal (34) and a regulating value generator (52) adapted to be activated by said means for producing a braking signal are also provided to supply an input for each of said first and said second minimum input selectors (54,63).

10. A regulating circuit as defined in claim 5 in which said second function generator (37) comprises a series connection of three resistors (371,372,373) including a first resistor (371) having its free connection connected to said means for producing a voltage proportional to compressor turbine speed (31), in which the common connection of said first resistor (371) and a second resistor (372) in said series is the output connection of said second function generator, in which further the free connection of a third resistor (373) in said series is connected to chassis or ground and in which a negative temperature coefficient resistor (374) is connected in parallel to said third resistor (373) and is so located as to measure the input temperature of said compressor.

11. A regulating circuit as defined in claim 10 in which said first, second and third resistors have at least approximately the resistance values of 1,000, 3,480 and 239,500 ohms, respectively, and said negative temperature coefficient resistor has values A = 0.8 ohms and B = 2,400°K for its resistance equation $R(T) = A \cdot e^{B/T}$.

12. A regulating circuit as defined in claim 3 in which said second function generator is a PD amplifying control circuit of which the differential component of the regulating characteristic is variable in dependence upon the compressor turbine speed ($n_1$).

13. A regulating circuit as defined in claim 12 in which said first function generator (38) is an amplifier (380) having a series connection of two resistors (382,383) providing a feedback path, said amplifier having its input (388) connected with said means (33) for producing voltage representative of operating temperature, and in which the common connection of said resistors (382,383) is connected over a series connection of a capacitor (384) and a resistor (385) to chassis or ground.

14. A regulating circuit as defined in claim 13 in which a multiplier circuit (386) is provided having a first input connected to the common connection of said capacitor and its series resistor (385) and having a second input connected through a reciprocal function circuit (387) with the output of said means (31) for producing a voltage proportional to compressor turbine speed and having its output connected to the common connection point of said feedback path resistors (382,383) of said first function generator (38).

15. A regulating circuit as defined in claim 1 in which said means for producing a voltage substantially proportional to operating temperature includes a thermocouple element the legs of which are composed of nickel and of a chromium-nickel alloy respectively.

16. A regulating circuit as defined in claim 1 in which said means for producing a voltage substantially proportional to operating temperature includes a computing circuit (FIG. 9) containing at least one integrating circuit (80), and in which a first and second power amplifier (61,64) arranged to amplify respectively the outputs of said first and second minimum input selectors (54,63) provide inputs to said computing circuit and in which the outputs of said means for producing a voltage substantially proportional to compressor turbine speed (31), said means for producing a voltage substantially proportional to compressor input temperature (32) and a third temperature responsive electrical device (66) are also connected to the inputs of said computing circuit.

17. A regulating circuit as defined in claim 16 in which said computing circuit (FIG. 9) includes at least one adding amplifier (82,86) located in the most direct path between either or both of the inputs (62,65) of said computing circuit, respectively connected to said first and second power amplifiers (61,64) and the output of said computing circuit.

18. A regulating circuit as defined in claim 17 in which said computing circuit at its output side is provided with a first inverting adder (86) having three inputs respectively connected to a second inverting adder (82), to said means for producing a voltage proportional to compressor input temperature and to said third temperature responsive electrical device (66) respectively.

19. A regulating circuit as defined in claim 18 in which the said second inverting adder (82) has three inputs connected through coefficient inserting potentiometers (91, 92) to said first power amplifier (61), to an inverter (84) and an integrator (80) respectively.

20. A regulating circuit as defined in claim 19 in which the input of said inverter (84) is connected with the output of a third inverting adder (81).

21. A regulating circuit as defined in claim 20 in which said third inverting adder (81) has two inputs connected respectively to said second power amplifier (64) and, through an inverter, to the output of said integrator (80).

22. A regulating circuit as defined in claim 21 in which said integrator (80) has four inputs respectively connected to the aforesaid inverter (84), to a second inverter (83), to the output of said integrator, and to said means for producing a voltage substantially proportional to compressor turbine speed (31).

* * * * *